US005589775A

United States Patent [19]

Kuckes

[11] Patent Number: 5,589,775
[45] Date of Patent: Dec. 31, 1996

[54] ROTATING MAGNET FOR DISTANCE AND DIRECTION MEASUREMENTS FROM A FIRST BOREHOLE TO A SECOND BOREHOLE

[75] Inventor: Arthur F. Kuckes, Ithaca, N.Y.

[73] Assignee: Vector Magnetics, Inc., Ithaca, N.Y.

[21] Appl. No.: 567,578

[22] Filed: Dec. 5, 1995

Related U.S. Application Data

[63] Continuation-in-part of Ser. No. 155,529, Nov. 22, 1993, abandoned.

[51] Int. Cl.[6] .............................. G01V 3/26; G01V 3/20; G01V 3/40; G01R 33/04
[52] U.S. Cl. ............... 324/346; 324/207.22; 324/207.26; 324/207.23; 175/45; 166/66.5
[58] Field of Search .................................. 324/338, 346, 324/326, 207.11, 207.13, 207.14, 207.15, 207.22, 207.23, 207.26; 175/40, 45, 50; 166/66.5

[56] References Cited

U.S. PATENT DOCUMENTS

| | | |
|---|---|---|
| 3,406,766 | 10/1966 | Henderson . |
| 3,589,454 | 6/1971 | Coyne . |
| 3,731,752 | 5/1973 | Schad . |
| 4,072,200 | 2/1978 | Morris et al. . |
| 4,323,848 | 4/1982 | Kuckes . |
| 4,372,398 | 2/1983 | Kuckes . |
| 4,443,762 | 4/1984 | Kuckes . |
| 4,502,010 | 2/1985 | Kuckes . |
| 4,529,939 | 7/1985 | Kuckes . |
| 4,700,142 | 10/1987 | Kuckes . |
| 4,710,708 | 12/1987 | Rorden et al. . |
| 4,791,373 | 12/1988 | Kuckes . |
| 4,845,434 | 7/1989 | Kuckes et al. . |
| 4,933,640 | 6/1990 | Kuckes . |
| 5,014,008 | 5/1991 | Flowerdew . |
| 5,074,365 | 5/1991 | Kuckes . |
| 5,151,658 | 9/1992 | Muramatsu et al. . |
| 5,218,301 | 6/1993 | Kuckes . |

Primary Examiner—Walter E. Snow
Attorney, Agent, or Firm—Jones, Tullar & Cooper, P.C.

[57] ABSTRACT

A method for determining the distance and direction from a first borehole to a second borehole includes generating, by way of a rotating magnetic field source at a first location in a second borehole, and elliptically polarized magnetic field in the region of the first borehole. First and second sensors positioned at an observation point in the first borehole measure the amplitude and relative phase of respective first and second components of the polarized magnetic field and from these measurements, the direction, relative to the sensors, from the observation point to the first location is determined. The distance between these points is determined by measuring at plural observation points amplitude variations with depth of the rotating magnetic field in the first borehole, and computing theoretical variations in the amplitude for different assumed distances between the observation points and the location of the magnetic field source. The measured amplitude variations are compared with theoretical variations to determine the distance between the first and second boreholes.

32 Claims, 7 Drawing Sheets

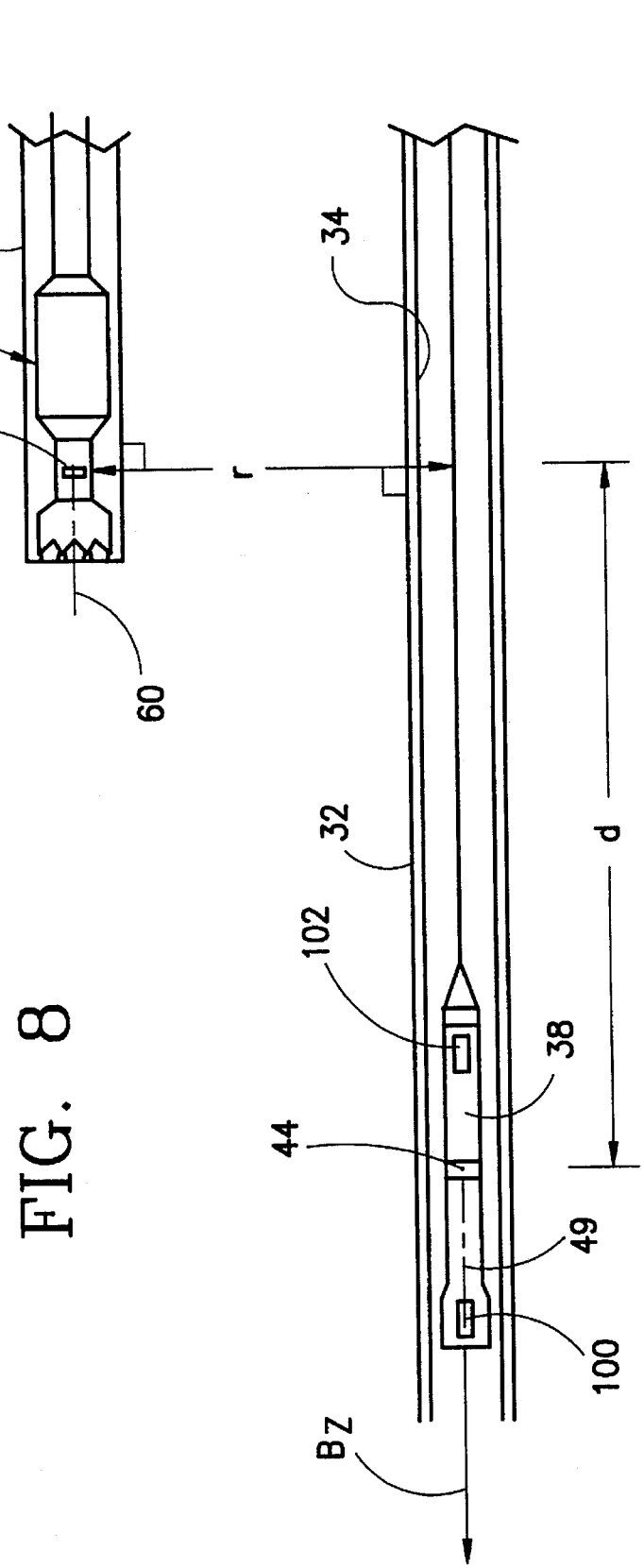

ROTATING MAGNET FOR DISTANCE AND DIRECTION MEASUREMENTS FROM A FIRST BOREHOLE TO A SECOND BOREHOLE

BACKGROUND OF THE INVENTION

This application is a continuation-in-part of U.S. Ser. No. 08/155,529, filed Nov. 22, 1993, and entitled "Rotating Magnet for Distance and Direction Measurements", now abandoned.

The present invention is directed, in general, to a method and apparatus for guiding directional drilling of a borehole, and more particularly to the generation of rotating magnetic fields for use in precisely measuring the distance and direction between an existing borehole and a borehole being drilled to achieve precisely controlled separation between the two boreholes.

Precise control of the distance between one or more existing wells, or boreholes, and a new well, or borehole being drilled is required from time to time in the oil and gas industry. For example, when a group of wells are drilled from an offshore platform, it is often necessary to drill new wells spaced three meters or less from existing wells for a distance of 300 meters or more during the initial depth interval before the wells are directionally deviated and drilled to targets which may be two kilometers or more away in lateral directions. Another example is found in the drilling of twin horizontal wells for steam-assisted gravity drainage (SAGD) of heavy oils. In this latter case, it is necessary to drill one well directly above the other while maintaining a five meter (±2 meter) spacing over 500 meters of horizontal extension at depths of 500 or more meters.

It is a common practice during the initial phases of drilling a well from a platform to perform numerous gyroscopic surveys to achieve the very precise drilling required to avoid collisions with neighboring existing wells. Such surveys, however, require dedication of the entire drilling rig for that purpose, and the time associated with repeated surveys of this kind, in addition to the lost production of oil due to the requirement of shutting down nearby producing wells during the period of drilling, gives great motivation for finding a better way to control the drilling operation.

Drilling twin horizontal wells to the specifications required for steam assisted gravity drainage wells is not possible with the usual gyroscopic and earth's magnetic field-based surveying methods, due to the lack of precision of such techniques. An alternative method for drilling well pairs is to use a controlled solenoid source in the first well of the pair in conjunction with a measurement while drilling (MWD) system in the second well. Such an MWD system senses the relative location of the nearby solenoid, and this downhole ranging technique has worked reasonably well during recent tests. However, such a technique has the limitation that in most directional drilling systems the drill bit is driven by downhole, fluid-powered motors, which are approximately 10 meters long. The measurement while drilling surveying electronics is mounted inside a ten meter long non-magnetic drilling collar section following the fluid powered motors. As a result, with this system the basic measuring point in the MWD apparatus is 15 or more meters behind the location of the drilling bit. This results in a depth lag between the measuring point of the survey instrument and the drill bit so that drilling direction adjustments are not made soon enough.

SUMMARY OF THE INVENTION

It is, therefore, an object of the present invention to produce a measurement while drilling system which allows continuous drilling of boreholes while permitting precise measurement of the distance and direction between the borehole being drilled and nearby existing boreholes.

It is another object of the invention to provide measurement while drilling apparatus in which a rotating magnetic field source is provided near a drill bit in a borehole being drilled for use in accurate and reliable measurements of the distance and direction from the drill bit to a nearby borehole to thereby permit precise control of the separation between the boreholes.

In accordance with the present invention, the distance and direction from a first borehole to a second borehole is determined by locating in one borehole, preferably the borehole being drilled, a rotating magnetic field source. This magnetic field source may be a permanent magnet mounted near the drill bit of a conventional drill string, with the north-south axis of the magnet being perpendicular to the axis of rotation of the drill. The magnetic field source produces a rotating, elliptically polarized magnetic field in the earth surrounding the borehole being drilled, the magnetic field extending into the region of a prior, or existing, borehole. This prior borehole may be an existing well which is to be avoided, for example, or may be a well which is to be tracked for precise parallel drilling of a second borehole. Magnetic field sensors, preferably a pair of highly sensitive fluxgate magnetometers, are positioned at an observation point in the first borehole within the elliptically polarized magnetic field generated by the rotating magnetic field source. In a preferred embodiment of the invention, the amplitude and relative phase of first and second components of the rotating magnetic field are detected by the sensors and the direction from the observation point to the magnetic field source is determined. This direction may be determined with respect to magnetic north or with respect to the high side of the existing borehole in order to determine the absolute direction to the borehole in which the rotating field source is located. If desired, a gyroscope may be used as a reference, with the direction to the magnetic field being determined with respect to that reference.

The distance from the observation point in the first borehole to the location of the source in the second borehole may also be calculated, in accordance with the invention, by determining the strength of the magnetic field source and comparing that known strength with the value measured at the observation point, since the field strength is inversely proportional to the cube of the distance from the source. However, because the observation point usually will be located within a casing of unknown magnetic characteristics, the effective strength of the magnetic field source for purposes of determining distance will differ from the actual field strength obtained from a direct measurement at the source. Accordingly, in a preferred embodiment, the effective field strength is determined by measuring, at plural observation points within the first borehole, amplitude variations with depth of the total magnetic field and computing theoretical variations in the amplitude for different assumed distances between the two boreholes. Thereafter, a measured amplitude is compared with the computed values to determine the distance. This computation may also be used to determine the effective strength of the magnetic field source, and thereafter that calculated effective strength can be used directly in further determinations of distance by simply measuring the amplitude of the magnetic field at the observation point.

In another embodiment of the invention, a pair of spaced axial component magnetic field sensors may be provided in the first borehole to measure the axial field gradient of the rotating magnetic field. This field gradient provides an indication of whether the observation point is approximately coplanar to the rotating magnet, and thus provides a measure of their relative depths. This field gradient can also be used to determine the effective strength of the field source for obtaining direct measurements of radial distance between the rotating magnet and the sensor at the observation point, as outlined above.

BRIEF DESCRIPTION OF THE DRAWINGS

The foregoing, and additional objects, features, and advantages of the present invention will be apparent to those of skill in the art from the following detailed description of preferred embodiments thereof, taken in conjunction with the accompanying drawings, in which:

FIG. 8 illustrates the relationship of a sensor for measuring axial field gradients to the rotating magnetic field source.

DESCRIPTION OF PREFERRED EMBODIMENTS

Figure 1:
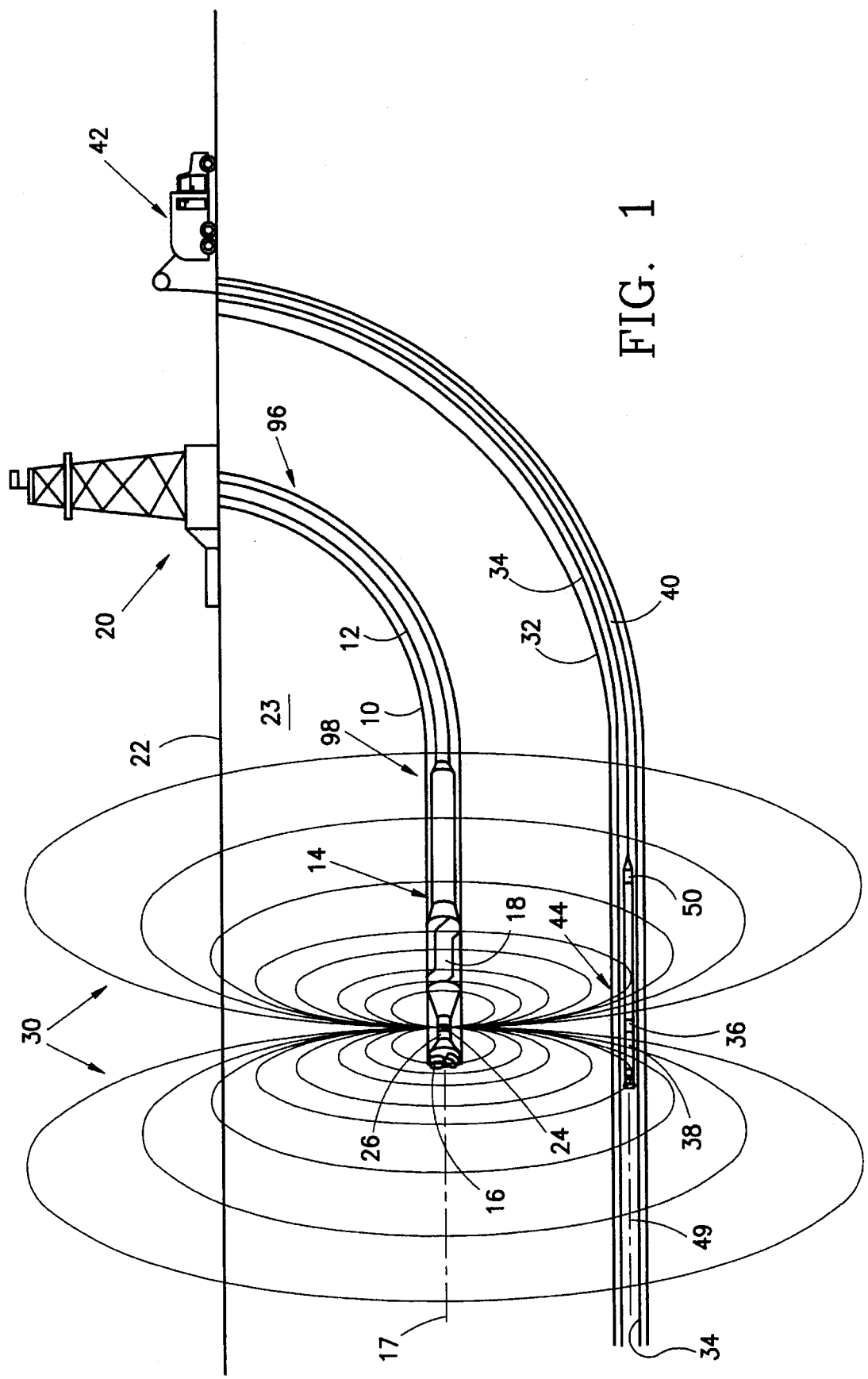
FIG. 1 illustrates a pair of horizontal, spaced wells in which the measuring system of the present invention is utilized for guiding a rotating drill bit carried on a drill string located in a well being drilled.

FIG. 1 diagrammatically illustrates the method and apparatus used, in accordance with the present invention, for guiding directional drilling of a second borehole to achieve precisely controlled separation with respect to a first, previously drilled borehole. Thus, in FIG. 1 a borehole 10 contains a drill string 12 incorporating a drill assembly generally indicated at 14. The drill assembly includes a drill bit 16 which is driven by suitable motors 18 in conventional manner, to rotate about a longitudinal axis of rotation 17, the drill bit being steerable to control the direction of drilling in response to control signals from a control station 20 located at the surface 22 of the earth 23. In accordance with the invention, an elliptically polarized rotating magnetic field is generated in, and is centered in, the borehole being drilled. For this purpose, the drill assembly 14 carries a field source such as a permanent bar magnet 24 mounted in a nonmagnetic piece of drill pipe 26 located just behind the rotating drill bit 16. The magnet is carried by the drill string 12 with north-south axes of the magnet perpendicular to the axis of rotation 17 of the drill bit 16. This bar magnet generates an elliptically polarized magnetic field generally indicated by the magnetic field lines 30, with the rotation of the magnet 24 about axis 17 producing an alternating magnetic field at an observation point radially spaced from the magnet.

An existing borehole 32 is illustrated in FIG. 1. This borehole 32 is illustrative of a horizontal well of the type which may be used for steam assisted gravity drainage of heavy oil. The borehole 32, which may include a casing 34, is a target well which is to be followed by the borehole 10 being drilled. In accordance with one example of the present invention, the drill bit 16 is controlled so that the borehole 10 is drilled directly above borehole 32 and is spaced above it by a predetermined, constant distance. Control of the drill bit 16 is carried out in response to measurements made in the target borehole 32 by means of a magnetic field sensor 36 located in a measuring tool 38. The measuring tool is lowered into the borehole 32 through casing 34 by means of a suitable wireline 40, with the location, or depth, of the measuring tool being controlled from the earth's surface in conventional manner from an equipment truck 42.

The magnetic field sensor 36 is located at an observation point 44 and incorporates, in a preferred embodiment, a pair of fluxgate magnetometers 46 and 48 (FIG. 2) having their axes of maximum sensitivity intersecting each other at the observation point and at right angles to each other. The magnetometers measure the amplitude and the phase of two perpendicular components of the polarized rotating magnetic field 30 which are both perpendicular to a longitudinal axis 49 of the measuring tool 38. The measuring tool also incorporates, in one form of the invention, an orientation sensor 50 for determining the orientation of the magnetic field sensor 36 with respect to either the borehole or to magnetic north. Such orientation devices are well known, and may include earth's field sensors, inclinometers, and/or a gyroscope.

Figure 2:
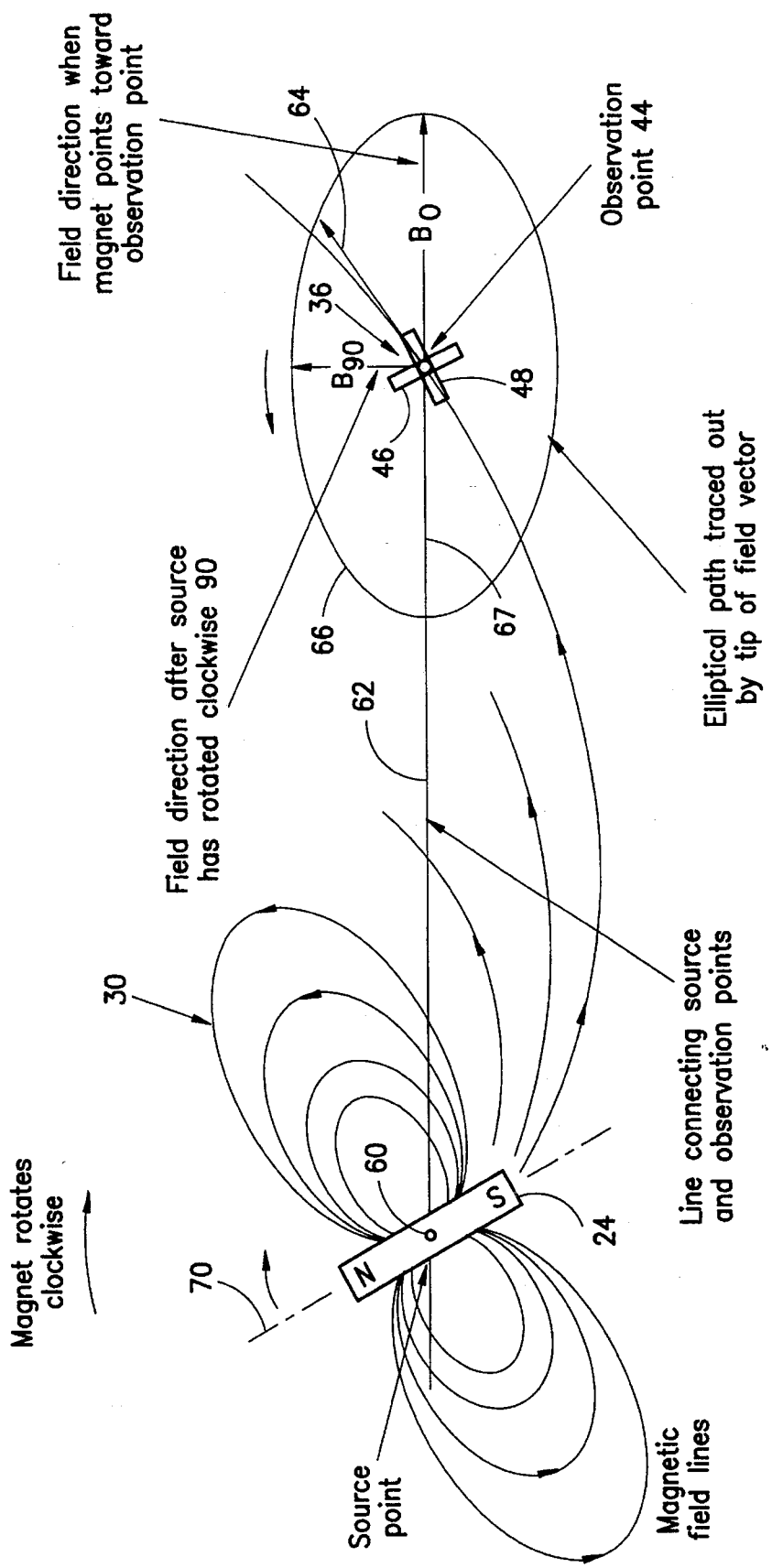
FIG. 2 is a diagrammatic illustration of the direction and strength of a magnetic field produced by a rotating magnetic field source carried by the drill string of FIG. 1.

The relationship between the rotating magnetic field source 24 and the magnetic field sensor 36 is illustrated in FIG. 2. As illustrated, the magnetic field source 24 may be a permanent magnet or an electromagnet rotating about a source point 60, which lies on the axis of rotation 17 of the drill bit 16 in FIG. 1. This axis 17 is essentially parallel to the axis 49 of the measuring tool 38 which passes through the observation point 44. As illustrated, magnet 24 may rotate in, for example, a clockwise direction, producing at the observation point 44 variations in the direction and strength of the magnetic field 30 in synchronism with the rotation of the magnet 24. When the south pole of the magnet 24 points toward the observation point 44 along radial line 62 joining source point 60 with observation point 44, the magnetic field 30 at the observation point is directed away from the source and is aligned with the radial line 62, as illustrated by magnetic field vector $B_0$. When the magnet 24 rotates 90° clockwise, the magnetic field vector at the point of observation rotates counterclockwise by 90°, as illustrated by the vector $B_{90}$. Thus, the magnetic field vector indicated generally at 64 at the observation point rotates in a sense opposite to that of the source magnet 24, and as the field vector rotates, its strength changes from $B_0$ to $B_{90}$, then to $B_{180}$, $B_{270}$ and back to $B_0$. The locus of the points defined by the tip of the field vector 64 follows an elliptical path 66, with the tail of the vector 64 being fixed at observation point 44. A magnetic field vector which rotates with temporally changing strength in this manner is said to be elliptically polarized.

The radial line 62 connecting source point 60 with observation point 44 coincides with the major axis 67 of the ellipse 66 and with the vectors $B_0$ and $B_{180}$. Since the magnetic field a fixed distance off the end of a bar magnet is twice as strong as the field at the same distance off the side of the bar magnet in the plane of rotation, the magnitude of the voltage generated by a magnetic field sensor which is aligned with the major axis of the ellipse and which thus points toward the source will be double that of a sensor whose axis of sensitivity is perpendicular to the major axis of the ellipse. In addition, there is a time difference between the maximum field vector component measured by the sensor aligned with the major axis and the maximum vector component measured by the sensor in the perpendicular direction. This time difference is equal to ¼ the rotation period of the rotating vector, and thus is ¼ the rotation period of the rotating magnet 24. This coincidence of the major axis of the magnetic field polarization ellipse with the direction to the source and the associated field phase and amplitude relationships constitute the physical basis for being able to evaluate the direction to the source point 60 from the observation point 44. This evaluation utilizes the amplitudes and the phase relationships of the voltages generated by the pair of fluxgate magnetometers 46 and 48. These magnetometers are preferably at right angles to each other and perpendicular to axis 49, with an arbitrary orientation within the borehole 32, and thus with respect to the radial line 62.

Figure 3:
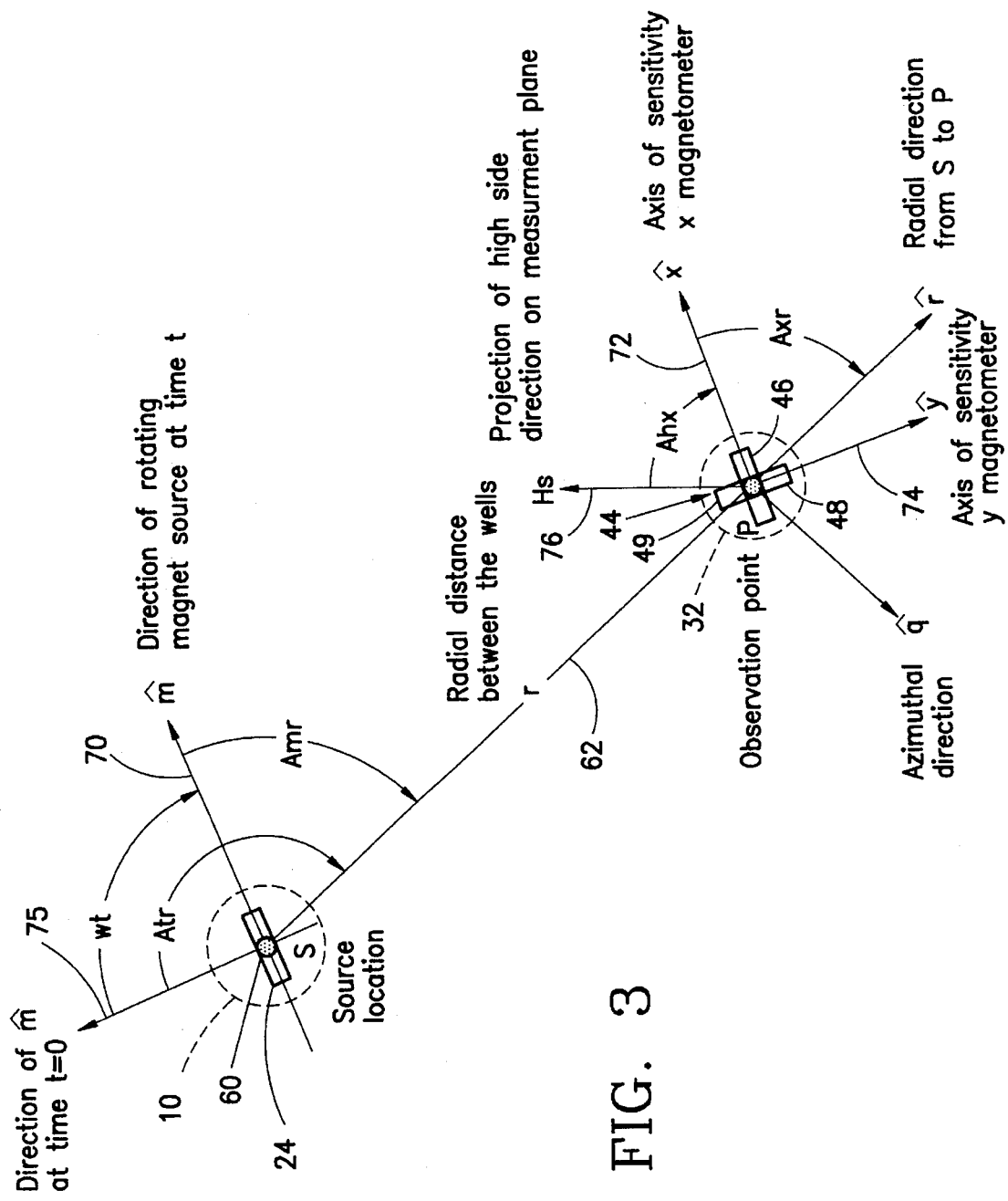
FIG. 3 is a schematic representation illustrating the mathematical analysis of the relationship between the rotating magnetic field source and measurements made at an observation point spaced from the source.

FIG. 3 is a schematic representation of the quantities used in evaluating the distance and direction from the observation point to the source. The figure is a sectional view of a plane which is perpendicular to the axis of the drill assembly 14, looking in the direction of drilling borehole 10, the figure illustrating the various quantities used in the mathematical analysis of the field measurements for determining distance and direction. FIG. 3 illustrates diagrammatically the rotating magnet 24 which rotates about source point 60 and axis 17 in a clockwise direction, in the manner described with respect to FIG. 2. Magnet 24 is illustrated as having a rotating north-south axis 70. The magnetometers 46 and 48 located in the neighboring target borehole 32 at observation point 44 are at right angles to each other, with the axis of sensitivity 72 of magnetometer 46 representing the x-axis while the axis 74 of magnetometer 48 represents the y-axis in the magnetometer plane. The radial distance r between source point 60 and observation point 44 is again indicated by radial line 62. The plane of measurement illustrated in FIG. 3 is also perpendicular to the axis of the measuring tool 38. For optimum results, the plane of measurement is at a drilling depth where the magnetometers 46 and 48 and the rotating magnet 24 are coplanar, since both the intensity and the ellipticity of the magnetic field 30 are at their maximum values.

Mathematically, the field of magnet 24 is described by a magnetic dipole pointing in the direction m̂ and having a strength of m Weber meters. The dipole 70 rotates at a rate of w radians/second so that the angle of axis 70 with respect to a reference direction 75 at a time t is given by the product wt. The angle Amr denotes the angle between m̂ and the direction of the line 62 from the source point 60 to the observation point p at point 44, line 62 representing the unit radius vector r̂.

The axes of the magnetometers 46 and 48 are indicated by unit direction vector x̂, illustrated by line 72, and by unit direction fector ŷ illustrated by line 74. These two unit vectors are perpendicular to each other when the magnetometers are perpendicular to each other, and both are perpendicular to the axis 49 of the plane of FIG. 3; thus, they are perpendicular to the axis of the measuring tool 38 which extends through observation point 44. The goal of the mathematical analysis is to find the angle Axr (FIG. 3), which is the angle between line 72 representing the unit vector x̂, and line 62 representing the unit vector r̂. The analysis is also designed to provide the distance r from the measurement of the field component $B_x$ in the x̂ direction and from the measurement of the magnetic field component $B_y$ in the ŷ direction. This analysis is carried out as follows:

Electromagnetic theory gives the field component $B_r$ in the radial direction r̂ and the field component $B_q$ in the azimuthal direction q̂ (90° from r̂) at the observation point 44 as $$B_r = \frac{m}{4\pi r^3} 2\cos(Amr) = 2M\cos(wt - Atr) \quad \text{(Eq. 1)}$$

and $$B_q = \frac{m}{4\pi r^3} \sin(Amr) = -M\sin(wt - Atr), \quad \text{(Eq. 2)}$$

where $$M = \frac{m}{4\pi r^3} \text{ and } Amr = Atr - wt, \quad \text{(Eq. 3)}$$

m being the strength of the magnetic field source and Amr being the angle between the direction of m̂ at time t=0 and the direction of the observation point, represented by r̂.

Noting FIG. 2, the rules of vector projection give:

$$B_x = B_r \cos(Axr) - B_q \sin(Axr) \quad \text{(Eq. 4)}$$

$$B_y = B_r \sin(Axr) + B_q \cos(Axr) \quad \text{(Eq. 5)}$$

Inserting Eqs. 1 and 2 into 3 and 4 and using the trigonometric relationship cos(A+B)=cos(A)cos(B)−sin(A)sin(B), the following is obtained:

$$B_x = M\sqrt{4\cos(Axr)^2 + \sin(Axr)^2}\ \cos(wt - Atr - P_x) \quad \text{(Eq. 6)}$$

$$\cos(P_x) = \frac{2\cos(Axr)}{\sqrt{4\cos(Axr)^2 + \sin(Axr)^2}} \quad \text{(Eq. 7)}$$

$$\sin(P_x) = \frac{\sin(Axr)}{\sqrt{4\cos(Axr)^2 + \sin(Axr)^2}} \quad \text{(Eq. 8)}$$

$$B_y = M\sqrt{r\sin(Axr)^2 + \cos(Axr)^2}\ \cos(wt - Atr - P_y) \quad \text{(Eq. 9)}$$

$$\cos(P_y) = \frac{2\sin(Axr)}{\sqrt{4\sin(Axr)^2 + \cos(Axr)^2}} \quad \text{(Eq. 10)}$$

$$\sin(P_y) = \frac{-\cos(Axr)}{\sqrt{4\sin(Axr)^2 + \cos(Axr)^2}} \quad \text{(Eq. 11)}$$

where $P_x$ and $P_y$ are defined by equations 6 and 9.

Inserting the above values for the sin and cos of $P_x$ and $P_y$ into the trigonometric formulae for $\cos(P_x - P_y)$ and $\sin(P_x - P_y)$, the following is obtained:

$$\sin(2Axr) = +\frac{4\cot(P_x - P_y)}{3} \quad \text{(Eq. 12)}$$

$$\cos(2Axr) = \frac{5(|B_x|^2 - |B_y|^2)}{3(|B_x|^2 + |B_y|^2)} \quad \text{(Eq. 13)}$$

$$Axr = \frac{\text{atan2}(\sin(2Axr), \cos(2Axr))}{2} \quad \text{(Eq. 14)}$$

where $|B_x|$ and $|B_y|$ denote the magnitude of $B_x$ and $B_y$ and the function atan2 is the four quadrant inverse tangent function. The fact that the angle Axr given by relations 12–14 leaves a 180 degree ambiguity in that angle is usually not a problem. Eq. 14 gives the important, and at first sight surprising result, that by measuring the amplitudes $|B_x|$ and $|B_y|$ of the alternating magnetic fields in the x̂ and ŷ directions, together with the relative phase angle between them ($P_x - P_y$), it is possible to determine the angle between the axes of the sensors and the radial line connecting the source and the observation point. This makes it possible to determine the relative direction of the source point 60 with respect to the magnetometers 46 and 48. Then, to find the absolute direction to the source, the orientation of the magnetometers in space is determined by the orientation sensor 50.

One way to orient the magnetometers 46 and 48 is to determine the direction of the high side (Hs) of the borehole (i.e. vertical) in which the magnetometers are located, and then to determine the angle Ahx, which is the angle between the axis x of the magnetometer 46, for example, and the direction of the projection of the vertical Hs onto the plane of measurement. Thereafter, once the angle Axr is determined, as discussed above, it can be combined with the angle Ahx using a pair of inclinometers in sensor 50, as is well known by those skilled in the art.

Alternatively, instead of using the vertical, or Hs direction to orient the magnetometers, projections of true North or magnetic North directions onto the plane of measurement can be done, utilizing earth's field sensors, as is well known by those skilled in the art. The angle between true North and $\hat{x}$ is added to angle Axr to obtain an absolute direction to the source. As another alternative, a gyroscope can be used in the sensor 50 to orient the magnetometers 46 and 48.

The distance r between the source point 60 and the observation point 44 is found from the measurements using the relationships derived from Eqs. 1–14 as follows:

$$r = \left(\frac{m}{4\pi}\right)^{1/3} \left(\frac{5}{|B_x|^2 + |B_y|^2}\right)^{1/6} \quad \text{(Eq. 15)}$$

The distance r can be evaluated from Eq. 15, provided the source strength m is known. Although the value of m can be readily determined at the earth's surface, the effective value of m downhole may be different, particularly if the measuring tool 38 is located within a steel casing 34, which significantly attenuates the magnetic field. Accordingly, the effective value of m may be determined by moving the measuring tool 38 along the axis of the borehole 32 and measuring the variation of the magnitude of the magnetic field as the relative depths of the sensor and observation point vary. This can be accomplished, for example, by holding the depth of measuring tool 38 fixed and observing the magnetic field signals as drilling progresses (and the location of the magnetic field source moves). The drilling depth corresponding to the point of approach, i.e., when the sensors 36 and the rotating source 24 are opposite each other and the observed magnetic field is strongest, as in the considerations above, defines a convenient reference depth for z, i.e., the depth where the parameter z, representing the axial distance from the plane of the sensors to the plane of the source, is 0. As the value of z is varied, the observed value of the magnitude of the field, $B_{mag}$, varies as $$B_{mag} = \sqrt{(|B_x|^2 + |B_y|^2)} = \frac{m}{4\pi r^3} \frac{\sqrt{2(z/r)^4 - 2(z/r)^2 + 5}}{(1 + (z/r)^2)^{5/2}} \quad \text{(Eq. 16)}$$

Figure 4:
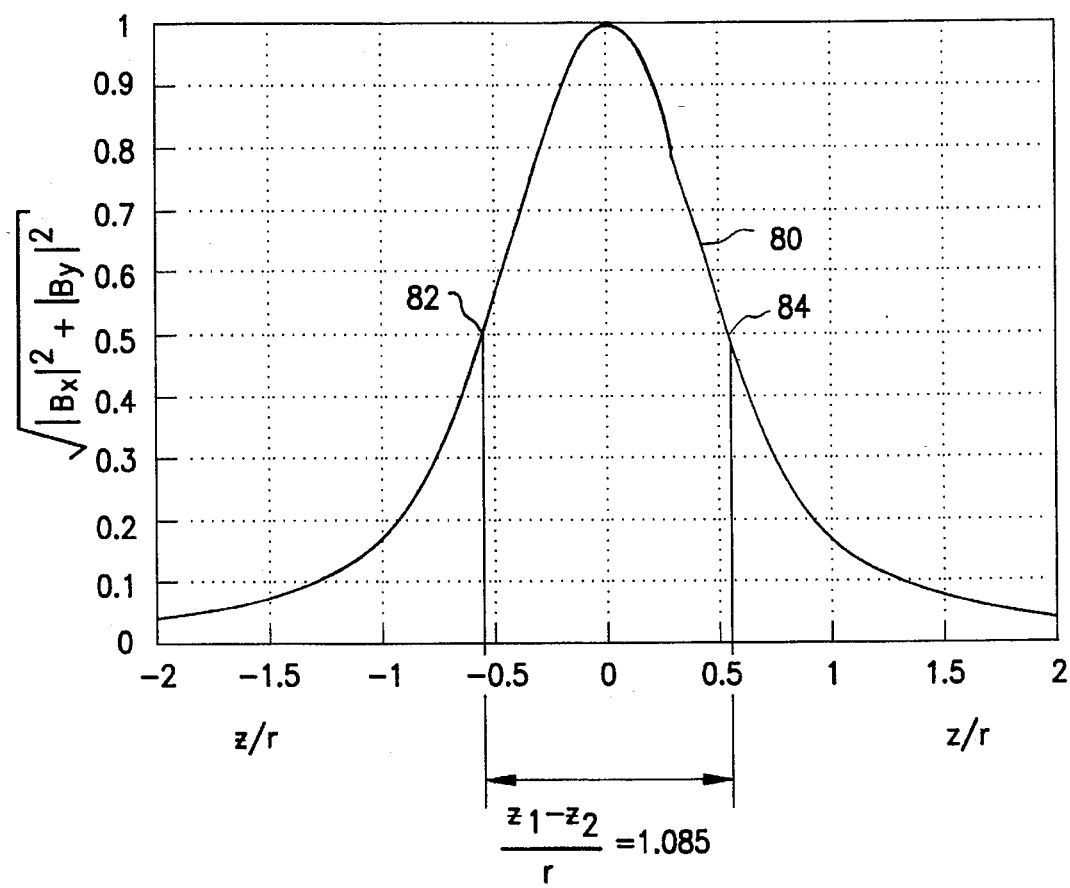
FIG. 4 is a curve illustrating the values of theoretical calculations utilized in the method of the present invention.

The z/r dependance of $B_{mag}$ is illustrated in FIG. 4 by bell-shaped curve 80, which has a characteristic full width at half height which defines a half height parameter $(z_1-z_2)/r=1.085$. The half height points 82 and 84 of the bell-shaped curve generated by a set of observations of $B_{mag}$ vs. depth define a depth interval $Dzhh=(z_1-z_2)$ from which the distance r between the wells is readily found; i.e.

$$r = 1.085 \; Dzhh \quad \text{(Eq. 17)}$$

Thus, the distance between the wells can be found in a simple way by noting the variation of the total alternating field intensity with depth without knowing the magnitude of the source strength. The value of r thus found and the field magnitude values $|B_x|$ and $|B_y|$ observed at the point of closest approach can then be used in conjunction with Eq. 15 to evaluate the source strength m. Once the source strength is evaluated by this analysis during one interval of drilling, it can usually be used for the entire well.

To apply the above results in practice usually will require some signal averaging, particularly if it is desired to realize the maximum range and precision inherent to the method. This can be done using a commercially available lockin amplifier. If an electronic lockin amplifier is used it should include a phase locked loop in the reference channel so that the slowly varying frequency of the signal can be followed. It will usually be more convenient to use digital techniques and to computationally encode the lockin amplifier functions of frequency locking and signal averaging. Alternatively, one can use well known mathematical methods of signal correction analysis using fast Fourier transforms as discussed in *Numerical Recipes in Pascal*, by Press, Flannery, Teukolsky and Vetterling, Cambridge University Pres, 1989 pages 457–462.

Figure 5:
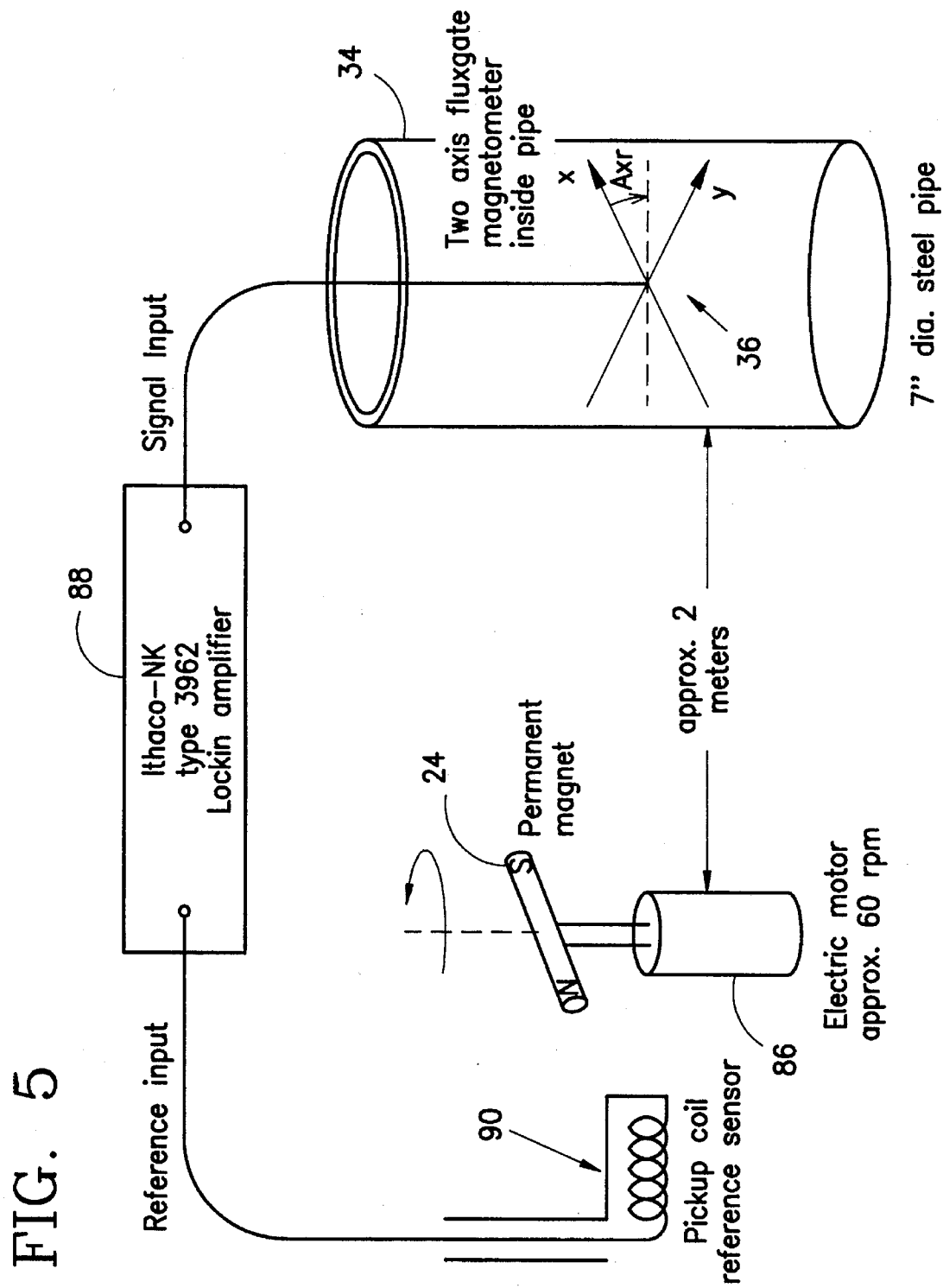
FIG. 5 is a diagrammatic illustration of apparatus constructed to evaluate the utility of the system of the present invention.
Figure 6:
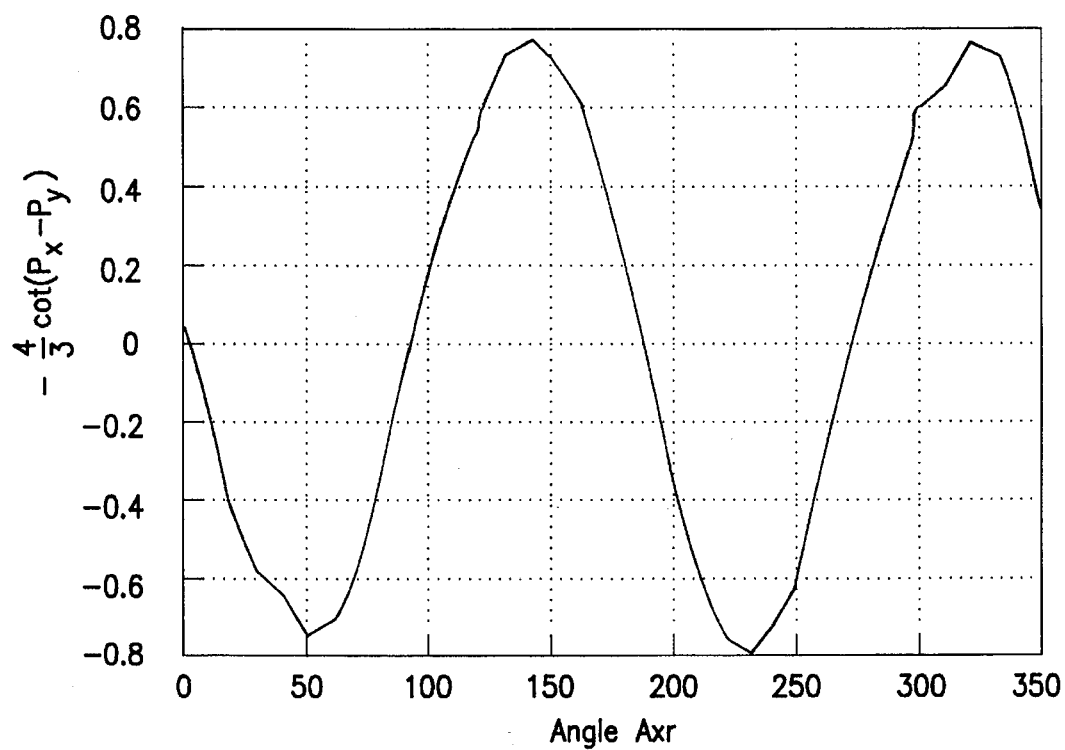
FIGS. 6 and 7 illustrate the results of calculations made in accordance with the present invention.
Figure 7:
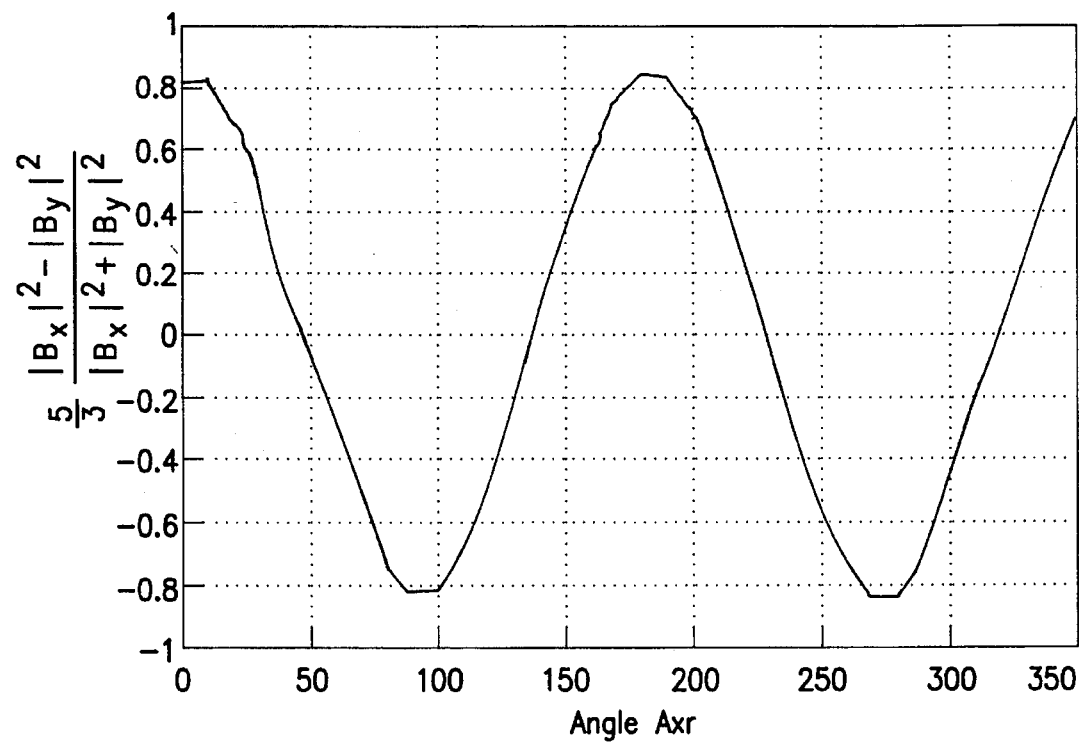

Tests of the system of the present invention were performed using the apparatus illustrated in FIG. 5 to evaluate the utility of the system and the effect of having the sensors 36 inside a steel pipe corresponding to casing 34, where the signal was attenuated by about a factor of 3. A motor 86 was used to rotate a samarium cobalt magnet 24 at about 60 rpm to simulate the rotation of a drill bit with a magnet mounted on it. A two-component "x y" fluxgate magnetometer 36 was mounted inside a 7 inch diameter steel casing 34 a few meters away on a protractor so that the angle of Axr with respect to the direction to the source could be changed. The magnetometer outputs were connected, one at a time, to an Ithaco NK type 3962 Lockin Amplifier 88. The reference channel for the local clock in the Ithaco instrument was provided by a third magnetic sensor 90, a small induction coil pickup near the rotating magnet and having its output connected to the phase lock circuitry of the Lockin amplifier. The results of using the analysis of this disclosure to provide information needed to compute the direction between the source 24 and the x axis of the magnetometer pair is shown in FIGS. 6 and 7. The dominant error in the measurement was due to distortion of the azimuthal component of the rotating magnet due to large machine tools being on either side of the sensors. Even with this error the results were satisfactory, indicating that highly accurate measurements would be attained upon elimination of the source of the error. The apparatus was also used to precisely measure the field inside the pipe with the rotating magnet over 12 meters away.

The relationships described above have assumed that the magnetic field source and the field sensor are coplanar, lying in a common plane that is perpendicular to the axes of both the target borehole and the parallel borehole being drilled. However, the accuracy with which the distance and direction from the drill location in the borehole being drilled to the observation point in the target borehole can be determined is significantly improved by taking into account the possibility that the source and the sensor may not be coplanar. This may be accomplished by measuring, at the sensor location, not only the magnetic field components in the x and y directions described above, but also the magnetic field component in the z direction; i.e. the axial field component, and more particularly the axial field gradient.

When the magnetometers at the observation point are coplanar with the rotating magnetic field source 24, as illustrated in FIG. 2, the axial component of the magnetic field 30 at the measuring point is zero. Thus, by measuring the axial field component at the sensor, it is possible to determine whether the source and the sensor are approximately coplanar. If this component is sufficiently small, the determination of distance and direction will be accurate. Furthermore, measurement of the axial field gradient, as by measuring the difference between the axial fields at two spaced points along the axis, can permit determination of the depths in the respective boreholes where the rotating magnetic field source and the sensor are coplanar. In addition, measurement of such a gradient can permit determination of the radial distance to the source.

To show these facts quantitatively, consider the mathematical relations which give the axial component of a magnetic field, i.e., Bz at an observation point r, z where r is as shown in FIG. 3 and z as in FIG. 8, with the observation point at 44. The magnetic field component Bz in the z direction z is given by $$Bz = \frac{3mrz}{4\pi (r^2 + z^2)^{5/2}}$$ (Eq. 18)

and the axial gradient of Bz, i.e., dBz/dz is given by $$dBz/dz = \frac{3mr}{4\pi (r^2 + z^2)^{5/2}} \left( 1 - \frac{5z^2}{r^2 + z^2} \right)$$ (Eq. 19)

For z/r<<1, which is often the case, are obtained the dominant terms $$Bz/(dBz/dz) = z$$ (Eq. 20)

which finds the depth interval to coplanarity. Again, for z/r<<1:

$$(dBz/dz) = 3m/(4\pi r^4)$$ (Eq. 21)

From equation (21) the radial distance of r to the source is determined.

The depth variation, i.e. the z dependance, of the magnetic field ellipticity is another quantity of interest. It is convenient to define this ellipticity parameter in a way which conforms to the linear, circular and elliptical polarization of electromagnetic waves. After noting geometric considerations and equations (1) and (2), the "polarization ellipticity" parameter E of the magnetic field components perpendicular to the axis of rotation of magnet 24 is:

$$E = (-2 + (z/r)^2)/(1 + (z/r)^2)$$ (Eq. 22)

The physical manifestations of this relation are that for large values of z/r, i.e., at points which are essentially on the axis 60 of magnet rotation, E=1. This corresponds to the magnetic field vector being circularly polarized; it rotates in synchronism and in the same direction as the magnet. At the point where (z/r)=√2, then E=0. In this case the magnetic field component perpendicular to the rotation axis 60 in the plane defined by the observation point 44 and the magnet rotation axis 60 goes to zero and the magnetic field vector is linearly polarized, with the direction of polarization being perpendicular to the plane defined by the measuring site 44 and the magnet rotation axis 60. Finally, at z/r=0, E=−2, corresponding to the elliptical polarization considered in FIG. 2, the field component in the plane defined by the measuring site 44 and the axis of rotation 60 is double that in the perpendicular direction. The sense of magnetic field rotation in this case is opposite to that of the rotating magnet.

Often the measuring site 44 will be inside a steel casing 34, as noted above, which because of its large magnetic permeability has the effect of "magnetically shielding" the interior volume of the pipe. This shielding effect is greater on the perpendicular component of the magnetic field than on the axial component. For a 7 inch diameter casing the perpendicular component may be attenuated by a factor of 3 or more whereas the z component may only be attenuated by 20% or 30%. Under these conditions, the axial field component and its gradient not only give a good distance determination but also often can be used advantageously to provide a reference channel for doing correlation analysis or digital lockin analysis of the smaller perpendicular field components.

An important application of this method and apparatus is to drill SAGD twin wells (Steam Assisted Gravity Drainage twin pairs) where two horizontal wells are to be drilled as shown in FIG. 1 with a separation of, for example, 5+/−2 meters for a kilometer or more of horizontal extension. The operational procedure for doing this will be described. The lower well 32 (FIG. 1) is drilled first using normal horizontal MWD guidance techniques. Typically, after 1000 meters of such drilling an up down uncertainty of +/−5 meters and a left right uncertainty of +/−30 meters accrues.

The vertical section 96 (FIG. 1) of the second well 10 is also drilled using normal drilling protocol, but at the start of drilling the horizontal section 98 of the second well, the measuring tool 38 including sensor 36 is "pumped" down a 3 inch diameter tube such as casing 34 in the well 32, as shown in FIG. 8, to a distance d approximately 5 meters beyond the depth of the drill bit 16. The drill assembly 14 carries the rotating magnet 24 as described above. This measuring tool includes inclinometers for determining the rotational orientation of the tool with respect to the vertical direction, or high side of the borehole, two fluxgate magnetometers with axes perpendicular to the tool axis 49 in the center of the tool, and two axial component fluxgate magnetometers 100 and 102, one at each end of the tool 38 and separated from one another by approximately 3 meters. Magnetometer circuitry connected to the respective magnetometers includes analog to digital converters with approximately 16 bits of resolution so that both the earth field and the small magnetic field fluctuations associated with the nearby rotating magnet can be measured.

Drilling of borehole 10 is usually done 10 meters at a time, i.e., the separation of conventional drill stem joints is approximately 10 meters so drilling is halted every 10 meters to add a drill pipe section. After the measuring of tool 38 has been deployed as described above, in soft formations it usually requires about 20 minutes to drill 10 meters. During this entire period the drill stem is maintained on a predetermined course by closely watching the outputs of the MWD package and orientation of the "bent sub" portion of the drill stem in a manner known by those skilled in the art of directional drilling. During this period the measuring tool 38 in the target borehole 32 is held stationary and is constantly registering measurements, with a computer constantly doing the required signal averaging and the field correlations discussed and described above. At the end of the 10 meter "joint" drilling is stopped, an MWD borehole survey taken and a new section of drill pipe is added to the stem.

During this period of adding a new drill pipe section, the output of the magnetometers and inclinometers in the measuring tool are analyzed. The field ellipticity and its variation with depth as well as the field and field gradient values are analyzed to determine the direction and distance to the reference well. The drilling direction adjustments for the next 10 meters are then decided upon. The measuring tool is then pumped ahead 10 meters, the 10 meter value being adjusted from the measurements made during the last interval of drilling so that the package is optimally positioned for the next interval of drilling.

Although the invention has been described in terms of preferred embodiments, it will be understood that modifications may be made without departing from the true spirit and scope thereof as defined in the following claims.

What is claimed is:

1. A method for determining the direction from a magnetic field source to an observation point, comprising:

generating, by way of a rotating magnetic field source at a first location, an elliptically polarized magnetic field in the region of an observation point;

measuring, by first and second sensors at said observation point the amplitude and relative phase of respective first and second perpendicular vector components of said ellipticity polarized rotating magnetic field; and determining from said measurements the direction, relative to said sensors, from said observation point to said first location.

2. The method of claim 1, further including:

determining the total field strength of said polarized magnetic field at said observation point;

determining the strength of said magnetic field source; and determining from the measured total field strength and from the strength of said magnetic field source, the distance from said observation point to said source.

3. The method of claim 2, wherein the step of determining the strength of said source comprises measuring said source prior to its placement in said first borehole.

4. The method of claim 1, further including:

determining the orientation of said first and second sensors to obtain an absolute direction from said observation point to said first location.

5. The method of claim 4, wherein the step of determining the orientation of said first and second sensors includes determining their orientation with respect to the earth's magnetic field.

6. The method of claim 4, further including locating said observation point in an existing borehole, and said rotating magnetic field source in a second borehole, and wherein the step of determining the orientation of said first and second sensors includes determining their orientation with respect to the high side of said existing borehole.

7. The method of claim 4, wherein the step of determining the orientation of said first and second sensors includes providing a gyroscope at said observation point and establishing therefrom reference axes for said sensors, the direction from said observation point to said first location being relative to said sensor reference axes.

8. The method of claim 1, further including determining from said measurements the distance from said observation point to said first location.

9. A method for determining the distance and direction from a magnetic field source to an observation point, comprising:

generating from a rotating magnetic field source at a first location an elliptically polarized magnetic field in the region of an observation point;

measuring, by first and second sensors at the observation point, variations in amplitude and relative phase of respective first and second components of said polarized magnetic field;

determining from said measurements the direction, relative to said sensors, from said observation point to said first location;

measuring at plural observation points amplitude variations of the rotating magnetic field;

computing theoretical variations in the amplitude of the rotating magnetic field for different selected distances between said observation points and said first location; and comparing the measured amplitude variations with the computed theoretical variations to determine the distance between said first location and said observation points.

10. The method of claim 9, further including locating said rotating magnetic field source in a first borehole and said observation points in a second borehole and measuring said amplitude variations at plural observation points in a second borehole to thereby determine the distance between said first and second boreholes.

11. The method of claim 10, further including measuring first and second perpendicular vector components of said polarized magnetic field by said first and second sensors, determining the orientation of said sensors, and determining from said measured components and said orientation an absolute direction from said second borehole to said first borehole.

12. A method for determining the distance from a first borehole to a second borehole, comprising:

generating, by way of a rotating magnetic field source at a first location in a first borehole, an elliptically polarized magnetic field in the region of a second borehole;

measuring at plural observation points in said second borehole, variations with depth in the amplitude of said polarized magnetic field;

computing theoretical variations in the amplitude of the total magnetic field for different selected distances between said observation points and said first location; and comparing the measured amplitude variations with the computed theoretical variations to determine the distance between said first and second boreholes.

13. A method for determining the distance from a first borehole to a second borehole, comprising:

generating by way of a rotating magnetic field source at a first location in a first borehole, a rotating elliptically polarized magnetic field extending to the region of a second borehole;

measuring, by first and second sensors at an observation point in said second borehole, the total rotating magnetic field;

measuring at plural observation points in said second borehole the amplitude variations with depth of the total magnetic field in the second borehole;

computing theoretical variations in the amplitude of the total magnetic field for different selected distances between said observation points and said first location;

comparing the measured amplitude variations with the computed theoretical variations to determine the distance between said first and second boreholes;

obtaining from the determined distance between said first and second boreholes and from said measured total magnetic field at said second borehole the strength of said magnetic field source; and determining from said magnetic field source strength and from the measured total magnetic field the distances from plural observation points in said second borehole to source locations in said first borehole.

14. Apparatus for determining the direction from a magnetic field source to an observation point, comprising:

a rotating magnetic field source at a first location, said source producing a rotating, elliptically polarized magnetic field in the earth;

an observation point located in said rotating magnetic field;

first and second sensors located at said observation point to measure first and second vector components of said rotating elliptically polarized magnetic field; and means for determining, from measurements of the amplitude and phase of said first and second measured components, the direction of said source with respect to said sensors.

15. The apparatus of claim 14, wherein said source is located in a first borehole and said observation point is in a second borehole, and wherein said first and second boreholes are generally horizontal and are spaced apart.

16. The apparatus of claim 15, wherein said boreholes are parallel.

17. The apparatus of claim 15, wherein said first and second boreholes are generally vertical and spaced apart.

18. The apparatus of claim 17, wherein said first and second boreholes are parallel.

19. The apparatus of claim 14, wherein said magnetic field source is a permanent magnet mounted for rotation on a drill string in a borehole being drilled for measurement while drilling.

20. The apparatus of claim 19, wherein said permanent magnet has a north-south axis mounted perpendicular to an axis of rotation of said drill string.

21. The apparatus of claim 14, further including means for orienting said first and second sensors.

22. The apparatus of claim 21, wherein said source is located in a first borehole and said observation point is in a second borehole, and wherein said orienting means includes means for determining the direction of a high side of said second borehole with respect to said sensors.

23. The apparatus of claim 21, wherein said orienting means includes gyroscope means.

24. The apparatus of claim 14, further including means for measuring the strength of said magnetic field at said observation point and for determining the distance between said observation point and said first location.

25. A method for determining the direction from a target borehole to a borehole being drilled, comprising:

generating a rotating elliptically polarized magnetic field in said borehole being drilled;

measuring the amplitude and relative phase of perpendicular vector components of said rotating magnetic field at an observation location in said target borehole; and determining from said vector components the direction from said borehole being drilled to said borehole being drilled.

26. The method of claim 25, further including generating said magnetic field at a source location in said borehole being drilled and positioning a magnetic field sensor at said observation location, said source location being coplanar with said sensor in a plane substantially perpendicular to said target borehole.

27. The method of claim 25, further including:

generating said magnetic field at a first depth in said borehole being drilled;

positioning a magnetic field sensor at said observation location in said target borehole;

measuring the amplitude and relative phase of vector components of said rotating magnetic field in a plane perpendicular to a longitudinal axis of said target borehole.

28. The method of claim 27, further including positioning said sensor to include said first depth in said plane.

29. The method of claim 27, further including measuring the field gradient of said rotating magnetic field along said target borehole longitudinal axis and determining the relative depth of said sensor in said target borehole with respect to said first depth.

30. The method of claim 29, further including determining the distance between said target borehole and said borehole being drilled.

31. The method of claim 27, further including positioning an axial magnetic field sensor at a location along said target borehole axis for measuring the axial vector component of said rotating magnetic field.

32. The method of claim 31, further including:

generating said rotating magnetic field at a source location on a drill assembly, whereby said first depth of said source location varies during drilling;

positioning said sensor at a fixed observation location in said target borehole; and measuring said perpendicular and axial vector components during drilling.

* * * * *

UNITED STATES PATENT AND TRADEMARK OFFICE
CERTIFICATE OF CORRECTION

PATENT NO. : 5,589,775
DATED : December 31, 1996
INVENTOR(S) : Arthur F. Kuckes

It is certified that error appears in the above-indentified patent and that said Letters Patent is hereby corrected as shown below:

Claim 1, line 9, change "ellipticity" to --elliptically.

Claim 25, line 10, change "from said borehole being drilled" to --from said target borehole--.

Signed and Sealed this

Third Day of June, 1997

BRUCE LEHMAN

Attest:

Attesting Officer

Commissioner of Patents and Trademarks